(12) United States Patent
Shirota

(10) Patent No.: US 7,190,435 B2
(45) Date of Patent: Mar. 13, 2007

(54) PATTERN WRITING APPARATUS AND PATTERN WRITING METHOD

(75) Inventor: Hiroyuki Shirota, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 175 days.

(21) Appl. No.: 10/814,429

(22) Filed: Apr. 1, 2004

(65) Prior Publication Data

US 2004/0201832 A1    Oct. 14, 2004

(30) Foreign Application Priority Data

Apr. 10, 2003  (JP) ............... P2003-105962
Dec. 18, 2003  (JP) ............... P2003-420365

(51) Int. Cl.
G03B 27/54    (2006.01)

(52) U.S. Cl. ............... 355/67; 355/71; 250/492.2

(58) Field of Classification Search ............... None
See application file for complete search history.

(56) References Cited

U.S. PATENT DOCUMENTS

| | | | |
|---|---|---|---|
| 5,049,901 A | 9/1991 | Gelbart | |
| 5,291,329 A | 3/1994 | Wakimoto et al. | |
| 6,133,986 A | 10/2000 | Johnson | |
| 6,251,550 B1 * | 6/2001 | Ishikawa | 430/22 |
| 6,473,237 B2 | 10/2002 | Mei | |
| 6,486,938 B1 * | 11/2002 | Morita et al. | 355/32 |
| 6,493,867 B1 | 12/2002 | Mei et al. | |
| 6,537,738 B1 | 3/2003 | Mei et al. | |
| 2003/0123040 A1 * | 7/2003 | Almogy | 355/69 |

FOREIGN PATENT DOCUMENTS

| | | |
|---|---|---|
| EP | 0 528 285 A1 | 2/1993 |
| EP | 0 556 591 A1 | 8/1993 |
| EP | 0987875 * | 3/2000 |
| JP | 62-021220 | 1/1987 |
| JP | 6-55776 | 3/1994 |
| JP | 06-083023 | 3/1994 |
| JP | 6-100829 | 12/1994 |
| JP | 2710519 | 10/1997 |
| JP | 2717035 | 11/1997 |
| JP | 10-112579 | 4/1998 |
| JP | 2875125 | 1/1999 |
| JP | 2001-133893 A | 5/2001 |
| JP | 3254248 | 11/2001 |
| WO | WO 2001-500628 A | 1/2001 |

* cited by examiner

*Primary Examiner*—D. Rutledge
(74) *Attorney, Agent, or Firm*—McDermott Will & Emery LLP

(57) ABSTRACT

A pattern writing apparatus for writing a pattern on a photosensitive material comprises a head provided with a DMD having a micromirror group which modulates reflected light, a stage holding a substrate, and mechanisms for moving the head and the stage relative to each other. In the pattern writing apparatus, for pattern writing, an irradiation region group on a substrate, which corresponds to the micromirror group of the DMD, is scanned in a main scanning direction that is angled relative to the direction of arrangement of the irradiation region group. The irradiation region group is also intermittently moved in the sub-scanning direction by a distance shorter than the width of the irradiation region group in the sub-scanning direction, for pattern writing of the entire substrate.

20 Claims, 12 Drawing Sheets

F I G. 17
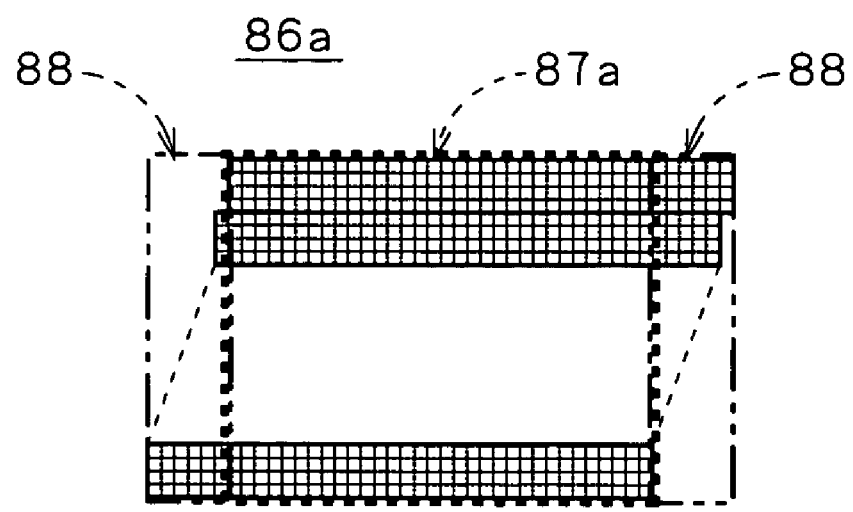

PATTERN WRITING APPARATUS AND PATTERN WRITING METHOD

BACKGROUND OF THE INVENTION

1. Field of the Invention

The present invention relates to a technique for writing a pattern by light irradiation on a photosensitive material.

2. Description of the Background Art

Conventionally well known are techniques for applying a light beam modulated by a spatial light modulator such as a digital micromirror device (DMD) onto a photoresist film formed on a substrate such as a semiconductor substrate or a printed circuit board.

Japanese Patent Application Laid-open No. 62-21220 discloses a technique for writing a fine pattern by applying a light beam which is spatially modulated by a micromirror group of a DMD onto a photosensitive material while moving the photosensitive material and controlling a signal given to the DMD.

Also, Japanese Patent Application Laid-open No. 2001-133893 suggests a technique for writing a finer pattern by tilting an image formed by a DMD on a photosensitive material at 45 degrees relative to a main scanning direction. FIG. 1 is a diagram for explaining the pattern writing suggested in the above reference. In an image 90 formed by a DMD on a photosensitive material in FIG. 1, an irradiation region group 91 arranged in a row in a direction perpendicular to the main scanning direction corresponds to a set of main scan mirrors of the DMD, and another irradiation region group 92 which is arranged in the direction perpendicular to the main scanning direction and each of whose regions is located between adjacent regions of the irradiation region group 91, corresponds to a set of interpolation main scan mirrors of the DMD. The image 90 is scanned on the photosensitive material in a direction indicated by arrow 94, i.e., the main scanning direction and at some point in time, a space between adjacent regions on the photosensitive material which are irradiated with light by the respective main scan mirrors is irradiated with light by each of the interpolation main scan mirrors. This achieves fine pattern writing.

When changing an image (i.e., a pattern indicating spatial modulation of a light beam) formed on a photosensitive material, the spatial light modulator such as a DMD requires, for example, time to write data into memory cells each corresponding to one light modulating element and time between receiving a reset pulse and holding each light modulating element in position (i.e., fixing the position (orientation) of each micromirror of the DMD). However, there are technical limitations to what we can do to shorten such times. Thus, it is not easy to drive the spatial light modulator at higher speed for faster pattern writing.

For example, in a DMD where 16 blocks of micromirrors, each block containing 48 rows and 1024 columns of micromirrors, are arranged in a column direction to form a matrix of 768 rows and 1024 columns, control is exercised block by block. However, addressing and writing data into the blocks is generally performed line by line; therefore, when this DMD is employed in the technique shown in FIG. 1, data must be written into every block 93 containing part of the main scan mirrors and the interpolation main scan mirrors, which makes it difficult to achieve high-speed pattern writing.

SUMMARY OF THE INVENTION

The present invention is directed to a pattern writing apparatus for writing a pattern by light irradiation on a photosensitive material and an object thereof is to write a fine pattern at high speed.

The pattern writing apparatus according to the present invention comprises a spatial light modulator applying a modulated light beam to an irradiation region group arrayed in a lattice arrangement on a photosensitive material, a main scanning mechanism for scanning the irradiation region group on a photosensitive material in a main scanning direction that is tilted relative to a direction of arrangement of the irradiation region group, so that a plurality of irradiation regions pass over each of writing regions included in writing region group fixed on the photosensitive material, a sub scanning mechanism for intermittently moving the irradiation region group relative to a photosensitive material in a sub-scanning direction orthogonal to the main scanning direction by a distance shorter than a width of the irradiation region group in the sub-scanning direction, and a controller controlling the spatial light modulator in synchronization with main scanning of the irradiation region group.

By arraying the irradiation region group in a lattice arrangement and by intermittently moving the irradiation region group relative to a photosensitive material in the sub-scanning direction by a distance shorter than the width of the irradiation region group in the sub-scanning direction, the pattern writing apparatus can write a pattern with efficiency, utilizing end portions of the irradiation region group in the sub-scanning direction. Thus, a fine pattern can be written at high speed.

In a preferred embodiment of the invention, the spatial light modulator comprises an array of a plurality of micromirrors, the orientations of which are individually changed. Also, the pattern writing apparatus writes a pattern on a photoresist film on a substrate.

For most efficient pattern writing, the travel distance of the irradiation region group in the sub-scanning direction in one intermittent movement is made approximately equal to the width of one side of the rectangular region in the sub-scanning direction, the one side extending approximately along the sub-scanning direction. That is the equation. $A = B \times \cos \theta$ is satisfied, where A is the travel distance of the irradiation region group in the sub-scanning direction in one intermittent movement, B is the length of one side of the rectangular region, the one side extending approximately along the sub-scanning direction, and $\theta$ is the angle formed between the sub-scanning direction and a direction approximately along the sub-scanning direction out of two directions of arrangement of the irradiation region group. This also prevents the occurrence of unevenness in pattern writing.

The main scanning mechanism further accelerates high-speed pattern writing by continuously moving the irradiation region group.

In a further preferred embodiment of the invention, the irradiation region group is a rectangular region in which irradiation regions are arrayed at equal pitches in two directions perpendicular to each other. The pattern writing apparatus further comprises a data generator generating data inputted into the spatial light modulator. The data generator performs the following steps: extracting a strip-like writing region group, which corresponds to one main scanning of the irradiation region group, from the writing region group; shifting, in the main scanning direction, each array of writing regions arranged in the main scanning direction in the strip-like writing region group so that writing regions corresponding to one light irradiation on the irradiation region group are arranged in the sub-scanning direction; and generating a data set, which is inputted into the spatial light modulator for each light irradiation, from pixel values each associated with each writing region in the writing region group after shifts. Thereby, a data set can suitably be generated.

The present invention is also directed to a pattern writing method of writing a pattern by light irradiation on a photosensitive material.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 16 and 17 are diagrams each illustrating a partial array after shifting.

DESCRIPTION OF THE PREFERRED EMBODIMENTS

Figure 1:
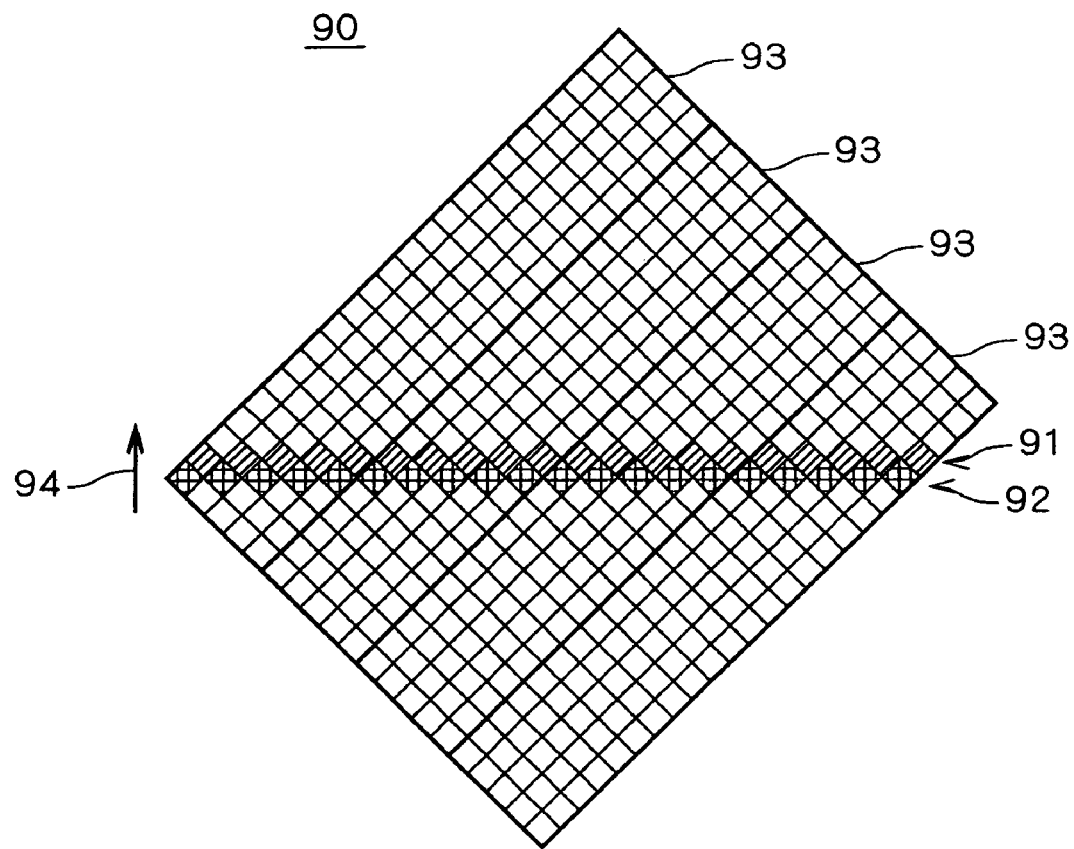
FIG. 1 is a diagram for explaining pattern writing by a conventional pattern writing apparatus.
Figure 2:
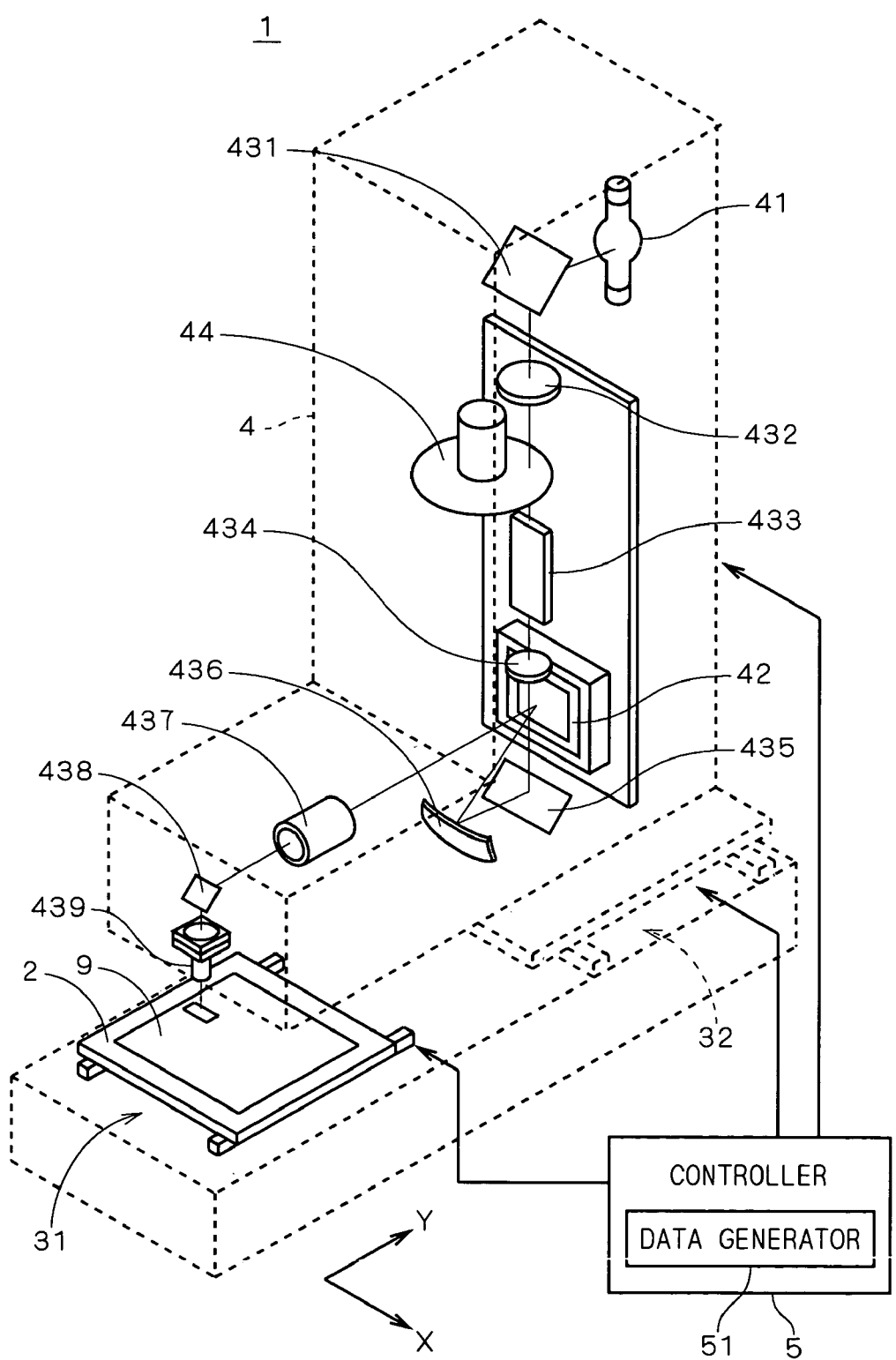
FIG. 2 is a view showing a structure of the pattern writing apparatus.

FIG. 2 is a view showing a structure of a pattern writing apparatus 1 according to one preferred embodiment of the present invention. In FIG. 2, part of the apparatus is shown by dashed lines for illustration of the internal structure of the apparatus. The pattern writing apparatus 1 comprises a stage 2 holding a substrate (e.g., a substrate for a printed circuit board) 9 on which a photoresist film is formed, a stage moving mechanism 31 for moving the stage 2 in the Y direction in FIG. 2, a head 4 emitting a light beam toward the substrate 9, a head moving mechanism 32 for moving the head 4 in the X direction in FIG. 2, and a controller 5 including a data generator 51 generating writing data inputted into the head 4.

The head 4 includes a light source 41 which is a lamp for emitting light, and a DMD 42 having an array of a plurality of micromirrors, the orientations of which are individually changed. The micromirror group reflects a light beam from the light source 41 to provide a spatially modulated light beam.

More specifically, the light emitted from the light source 41 is directed through a mirror 431 and a lens 432 to a light control filter 44 where the light beam is controlled to a desired amount of light. The light beam transmitted through the light control filter 44 is directed through a rod integrator 433, a lens 434 and a mirror 435 to a mirror 436, which then focuses and directs the light beam onto the DMD 42. The light beam incident on the DMD 42 is uniformly applied to the micromirror group of the DMD 42 at a predetermined angle of incidence (e.g., 24 degrees).

A light beam (i.e., a spatially modulated light beam) generated from only reflected light from part of the micromirrors of the DMD 42 which are set in a predetermined position (a position (or orientation) corresponding to an ON state later to be described in description of light irradiation by the DMD 42) enters a zoom lens 437 where the light beam is controlled in magnification and directed through a mirror 438 to a projector lens 439. The light beam from the projector lens 439 is then applied to a region on the substrate 9 which is optically conjugate to the micromirror group.

The stage 2 is fixed on a movable side of the stage moving mechanism 31 which is a linear motor, and the controller 5 controls the stage moving mechanism 31 so that an irradiation region group irradiated with light from the micromirror group (herein, one micromirror corresponds to one irradiation region) relatively moves in the Y direction in FIG. 2 over the photoresist film. That is, the irradiation region group is fixed relative to the head 4 and moves over the substrate 9 with movement of the substrate 9.

The head 4 is fixed on a movable side of the head moving mechanism 32 and intermittently moves in a sub-scanning direction (X direction in FIG. 2) perpendicular to the main scanning direction (Y direction) of the irradiation region group. That is, every time a main scan is completed, the head moving mechanism 32 moves the head 4 in the X direction to a start position for the next main scan.

Figure 3:
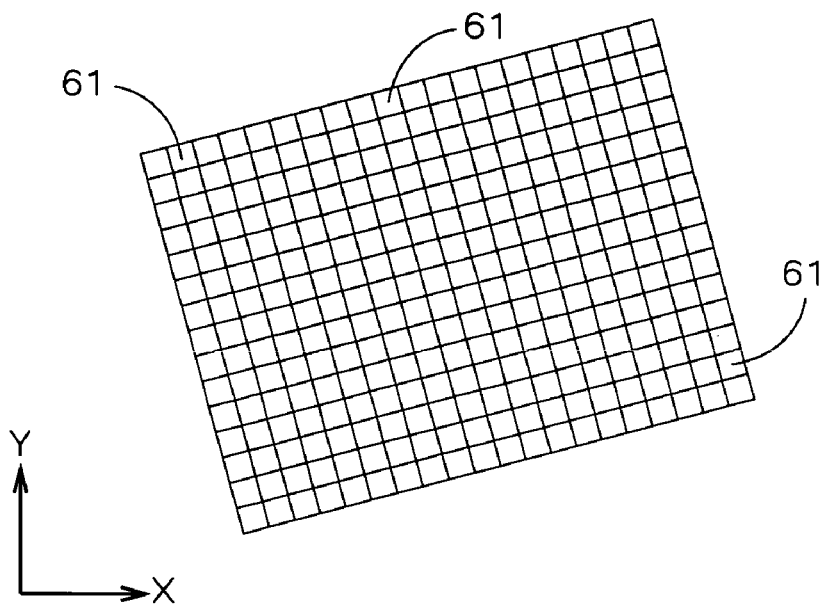
FIG. 3 is a diagram illustrating irradiation regions on a substrate.

FIG. 3 is a diagram illustrating irradiation regions 61 on the substrate 9. The DMD 42 is a spatial light modulator having a plurality of micromirrors arrayed at equal pitches in a lattice arrangement (the micromirrors shall be arranged to form an array of M rows and N columns in two directions perpendicular to each other). The irradiation region group on the substrate 9 is, as shown in FIG. 3, a rectangular region in which the irradiation regions 61 are arrayed at equal pitches in two directions perpendicular to each other.

When a reset pulse is applied from the controller 5 shown in FIG. 2 to the DMD 42, each of the micromirrors is tilted in unison in a predetermined position about a diagonal line of its reflecting surface according to data written in its corresponding memory cell. Thereby, the light beam applied to the DMD 42 is reflected in directions of the tilting of the respective micromirrors and light irradiation on the irradiation regions 61 is ON/OFF controlled. That is, when micromirrors whose memory cells are written with data indicating the ON state receive a reset pulse, light incident on those micromirrors is reflected onto the zoom lens 437 and applied to corresponding irradiation regions 61. On the other hand, micromirrors in the OFF state reflect incident light to a predetermined position other than that of the zoom lens 437, thus, no light is directed to their corresponding irradiation regions 61.

The DMD 42 is arranged inclined in the head 4 and as shown in FIG. 3, the direction of arrangement of the irradiation region group is angled relatively to the main scanning direction (i.e., Y direction). In the following description, out of two directions of arrangement of the irradiation region group, a direction approximately along the main scanning direction (i.e., a direction which forms a smaller angle with the main scanning direction) is referred to as a "column direction" and another direction approximately along the sub-scanning direction (i.e., X direction) is referred to as a "row direction".

Figure 4:
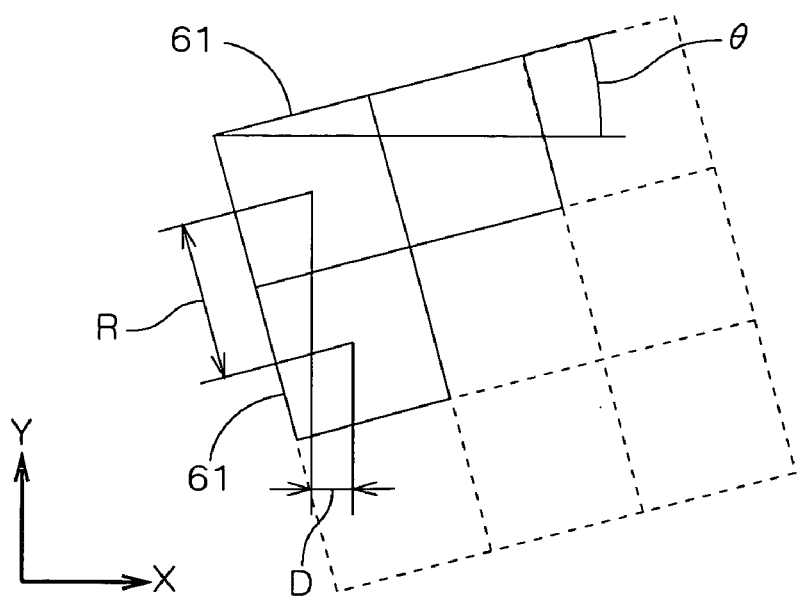
FIG. 4 is a diagram illustrating a tilt of the irradiation region group.

FIG. 4 is a diagram for explaining a tilt of the irradiation region group. If, as shown in FIG. 4, R is the pitch of the irradiation region group in both the row and column directions and θ is the angle formed between the row direction and the sub-scanning (X) direction (or the angle formed between the column direction and the main scanning direction), a center-to-center distance D along the sub-scanning direction between two adjacent irradiation regions 61 arranged in the column direction is expressed by the equation, D=R sin θ. That is, by tilting the irradiation region group at θ degrees to the main scanning direction, the pattern writing apparatus 1 can achieve pattern writing where the distance D is the smallest controllable unit (so-called pixel resolution) of pattern linewidth to be written.

Figure 5:
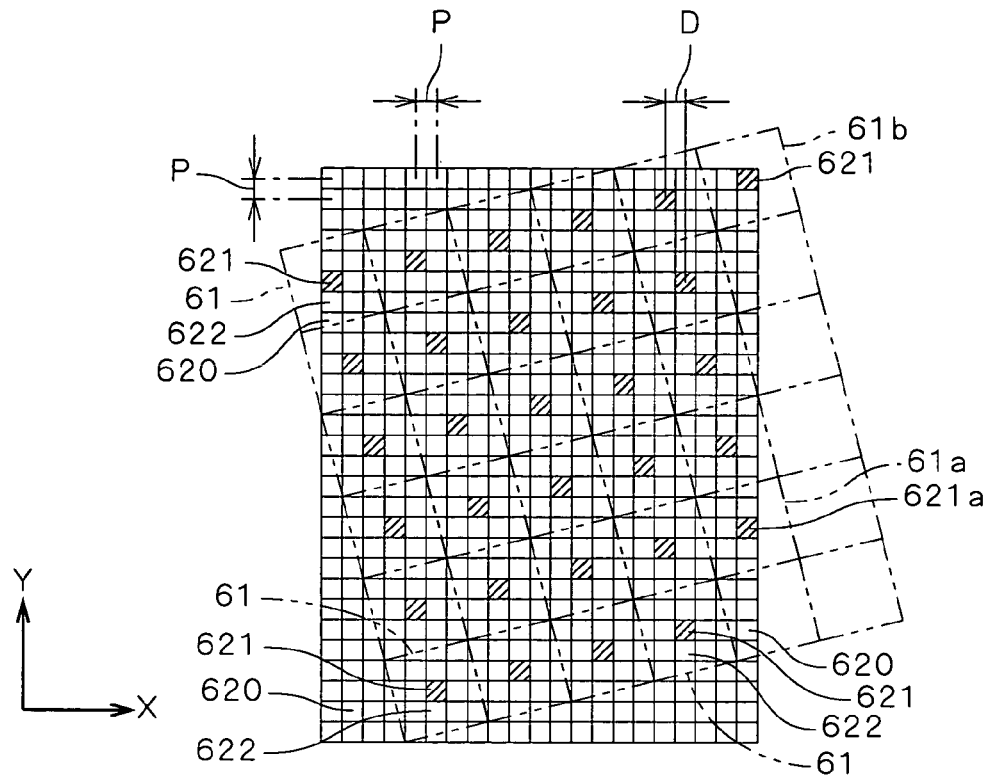
FIGS. 5 through 7 are diagrams for explaining pattern writing by the pattern writing apparatus.

FIG. 5 is a diagram showing the irradiation regions 61 and writing regions 620 overlapping one another on the substrate 9. The irradiation regions 61, as above described, are fixed relative to the head 4 and the writing regions 620 are fixed on the substrate 9 as a unit of writing. With movement of the head 4 relative to the substrate 9, the irradiation regions 61 move over the writing regions 620. In FIG. 5, the lattice irradiation region group irradiated with light from the respective micromirrors of the DMD 42 is indicated by dash-double-dot lines and the writing region group on the substrate 9 is indicated by solid lines. It is noted that only parts of the writing regions 620 and the irradiation regions 61 are shown in FIG. 5.

As shown in FIG. 5, the writing regions 620 are square regions arranged at pitches P in both the X (sub-scanning) and Y (main scanning) directions. The pitches P of the writing regions 620 are made equal to the above-described smallest controllable unit of writing and is thus equal to the center-to-center direction D along the sub-scanning direction between two adjacent irradiation regions 61 arranged in the column direction. Thus, each of the writing regions 620 is positioned at the center of either one of the irradiation regions 61 (more precisely, continuously moving irradiation regions 61) at any point of time in control of light irradiation by the DMD 42. When the irradiation regions 61 pass over each of the writing regions 620, light irradiation according to writing cell data corresponding to that writing region 620 (data written into a memory cell of each micromirror of the DMD 42) is performed centered about the writing region 620. Here, the writing regions 620 may be rectangular regions arranged at different pitches in the sub-scanning and main scanning directions.

When the center-to-center distance along the sub-scanning direction between two adjacent irradiation regions 61 arranged in the row direction is made equal to K times the pitches P of the writing regions 620 (that is, K writing regions 620 (or K addresses) are interpolated between two adjacent irradiation regions 61 arranged in the row direction), the angle θ formed between the row direction of the irradiation region group and the sub-scanning direction (see FIG. 4) is expressed by the equation, θ=arctan(1/K). Accordingly, when four addresses are interpolated between adjacent irradiation regions 61 as shown in FIG. 5, the angle θ formed by the irradiation region group is approximately 14 degrees and the pitches R of the irradiation region group is equal to a value obtained by multiplying the pitches P of the writing regions 620 by the square root of 17.

Next, the operation of the pattern writing apparatus 1 for writing a pattern on a photoresist film on the substrate 9 is described. In the following description of the operation of the pattern writing apparatus 1, the irradiation region group moves relative to the writing region group in both the main scanning and sub-scanning directions, and writing cell data to be inputted into each micromirror of the DMD 42 has already been obtained. A technique for generating the writing cell data will be described in detail after description of the pattern writing operation.

At the start of pattern writing, the irradiation region group moves to a start position for pattern writing of a region (hereinafter referred to as a "strip") that is written by one main scan, and a main scan starts. Then, writing cell data to be written into writing regions 621, which correspond to the locations of the irradiation regions 61 at first light irradiation, out of the writing regions 620 in FIG. 5 (i.e., the writing regions 621 located at the centers of the respective irradiation regions 61) is transmitted from the controller 5 to corresponding memory cells of the respective micromirrors of the DMD 42. The controller 5 then transmits a reset pulse to the DMD 42, whereby each of the micromirrors is tilted in a position (orientation) responsive to the memory cell data and first light irradiation (i.e., ON/OFF control of light irradiation) of the first writing regions 621 is performed.

Figure 6:
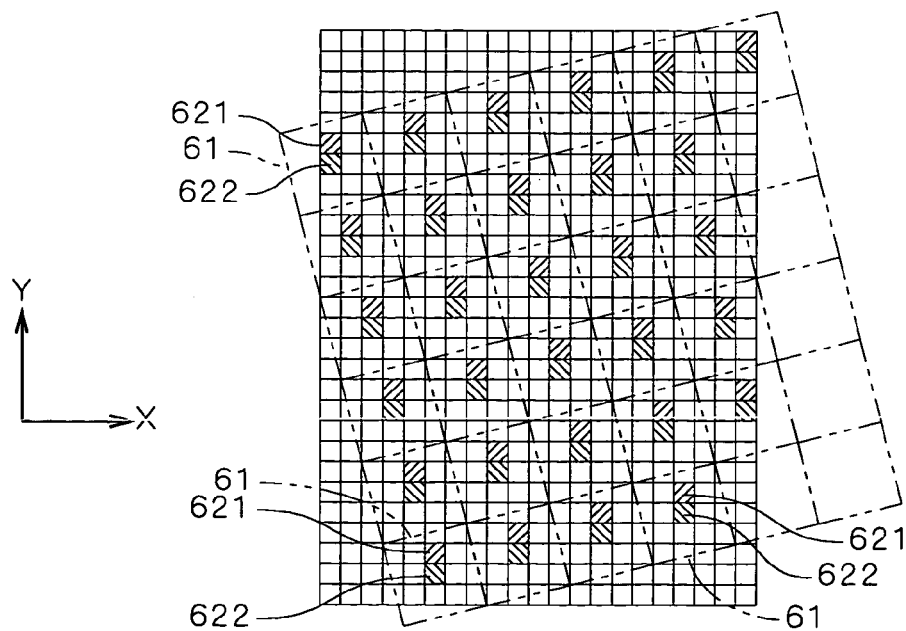

After the transmission of the reset pulse, writing cell data corresponding to the next writing regions 622 (i.e., the writing regions 622 located adjacent to the writing regions 621 on the (−Y) side) is transmitted and written into memory cells of the respective micromirrors. The transmission of a reset pulse to the DMD 42 is performed in synchronization with the operation of the stage moving mechanism 31 for continuously moving the stage 2 in the main scanning direction. More specifically, when the irradiation regions 61 move the pitch P in the main scanning direction (the (−Y) direction in FIG. 5) after the application of the first reset pulse, the next reset pulse is transmitted to the DMD 42 and each of the micromirrors is tilted in a position responsive to the writing cell data. Thereby, as shown in FIG. 6, light irradiation on the writing regions 622 is performed with the second reset pulse.

Figure 7:
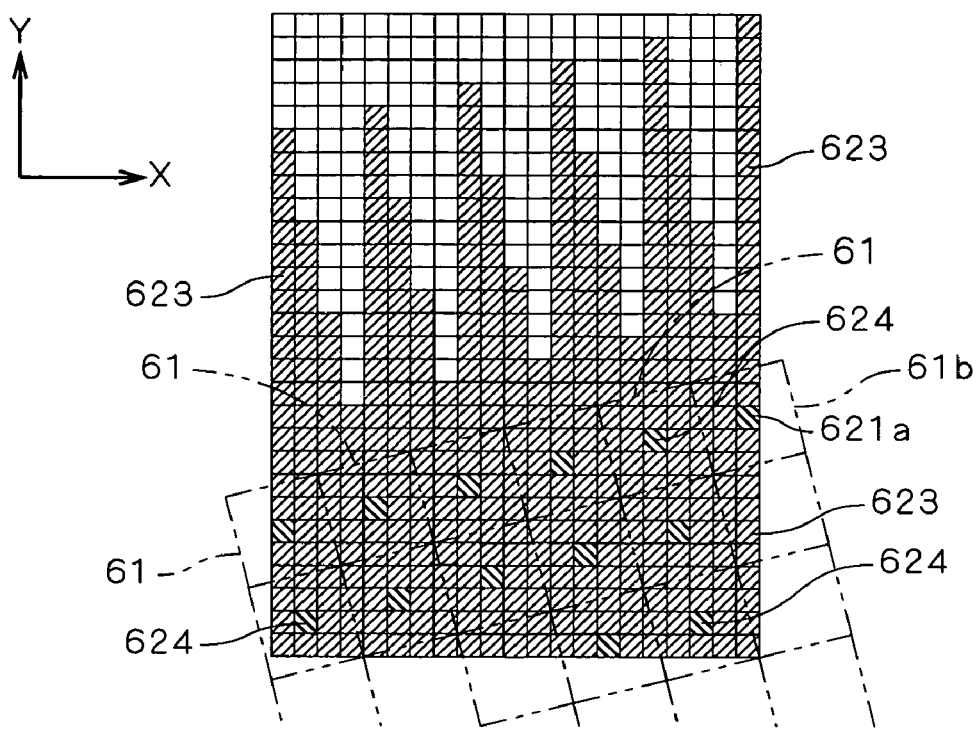

When the controller 5 repeats the above-described light irradiation in synchronization with control of the stage moving mechanism 31 and the DMD 42, second light irradiation centered about the writing regions 621 which were irradiated with light by the first light irradiation is performed with the eighteenth reset pulse. FIG. 7 is a diagram illustrating light irradiation with the eighteenth reset pulse. In FIG. 7, writing regions 623 irradiated with light only once and writing regions 624 irradiated with light twice (multiple times) are distinguished by the direction of cross-hatching.

Looking at, for example, a writing region 621a corresponding to an irradiation region 61a at the first reset pulse shown in FIG. 5, as illustrated in FIG. 7, the irradiation region 61b (located on the (+Y) side of the irradiation region 61a in FIG. 5) performs light irradiation centered about the writing region 621a with the eighteenth reset pulse. That is, the irradiation region 61b which is spaced four irradiation regions in the column (+Y) direction of the DMD 42 and one irradiation region in the row (+X) direction from the irradiation region 61a, passes over the writing region 621a, which was irradiated with light by the irradiation region 61a, and irradiates that writing region 621a with light for a second time.

By repeating the above operation, the pattern writing apparatus 1, when employing the DMD 42 comprised of M rows of micromirrors, repeats light irradiations (M/4) times on each of the writing regions 620 that are located in about a central portion of one strip on the substrate 9 with respect to the sub-scanning direction.

After completion of the writing of the strip (hereinafter referred to as the "n-th strip"), the irradiation region group moves in the sub-scanning direction to be located at a start position for writing of a next strip (hereinafter referred to as the "(n+1)-th strip"). Then, the above-described light irradiation operation is repeated for the (n+1)-th strip.

Figure 8:
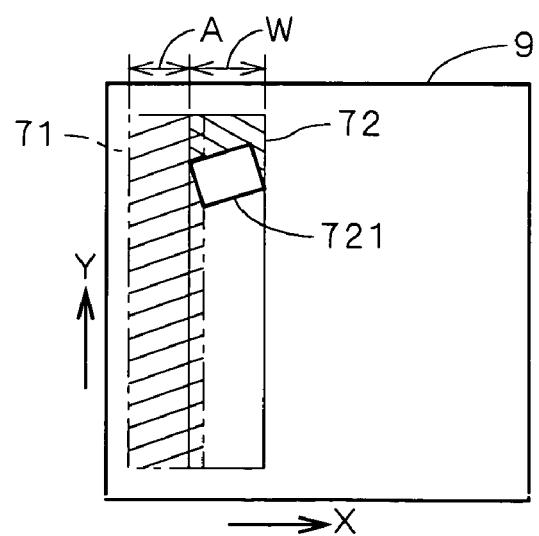
FIG. 8 is a view showing movement of the irradiation region group over the substrate.

FIG. 8 is a diagram showing that the irradiation region group after a sub scan moves in the main scanning direction for pattern writing. In FIG. 8, the irradiation region group is shown as a rectangular region 721, and the already-written n-th strip is designated by the numeral 71 and the (n+1)-th strip now being written by 72.

As shown in FIG. 8, the n-th strip 71 and the (n+1)-th strip 72 are spaced a distance A from each other in the sub-scanning (X) direction, partially overlapping one another. In other words, a travel distance A of the irradiation region group in the sub-scanning direction in one intermittent movement is smaller than the width of a single strip that is defined by the width W of the irradiation region group in the sub-scanning direction.

Figure 9:
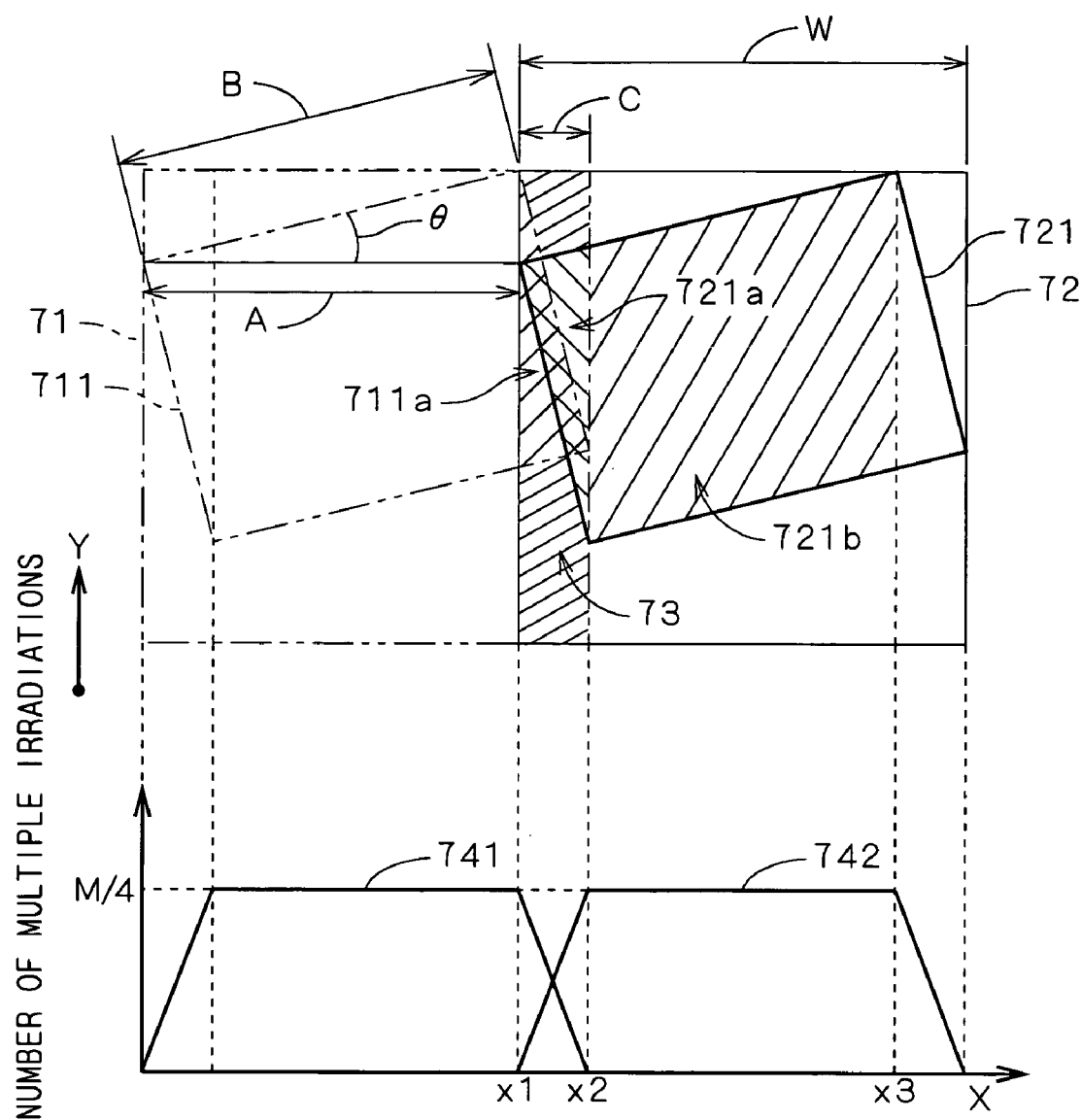
FIG. 9 is a diagram illustrating the irradiation region group on the substrate, and the relationship between the position of the irradiation region group in the X direction and the number of multiple irradiations.

FIG. 9 is a diagram for explaining the relationship between the position of each writing region 620 in the sub-scanning direction in main scanning of the irradiation region group before and after a sub scan, and the number of multiple light irradiations (more precisely, the number of times that the centers of the irradiation regions 61 pass over each of the writing regions 620, since actual light irradiation is not required). The upper part of FIG. 9 illustrates the irradiation region group on the n-th strip 71 and that on the (n+1)-th strip 72 arranged side by side, shown as rectangular regions 711 and 721, respectively. The lower part of FIG. 9 shows changes in the number of multiple light irradiations by the irradiation region group on the strips 71 and 72 with respect to the X (sub-scanning) direction.

In the pattern writing apparatus 1, as illustrated in the upper part of FIG. 9, the intermittent travel distance A of the irradiation region group is made equal to a width of one side of the rectangular regions 711, 721 in the sub-scanning direction, the one side being parallel to the row direction of the rectangular regions 711, 721 (i.e., one side extending approximately along the sub-scanning direction). That is, the intermittent travel distance A of the irradiation region group is obtained from the equation, $A = B \times \cos \theta$, where B is the length of one side of the rectangular regions 711, 721, the one side being parallel to the row direction, and $\theta$ is the angle formed between the row direction of the irradiation region group and the sub-scanning direction. Also, a width C over which the strips 71 and 72 overlap one another in the sub-scanning direction is expressed by the equation, $C = W - B \times \cos \theta$, where W is the width of the rectangular regions 711 and 721 in the sub-scanning direction.

When the equation, $A = B \times \cos \theta$ is satisfied, as illustrated in the upper part of FIG. 9, a right-triangle region of the rectangular region 711 on the right side, designated by 711a, and a right-triangle region of the rectangular region 721 on the left side, designated by 721a overlap one another and both pass over a cross-hatched region 73 (parts of the region 73 that overlap with the regions 711a and 721a are not cross-hatched; the "region 73" is hereinafter referred to as the "shared writing region 73").

As indicated by 741 in the lower part of FIG. 9, with the passing of the rectangular region 711, M/4 light irradiations are performed in about a central portion of the rectangular region 711; while the number of multiple irradiations in a portion between positions x1 and x2 within the range of the shared writing region 73 decreases linearly from the position x1 to x2, with the passing of the region 711a. On the other hand, as indicated by 742, with the passing of the rectangular region 721, M/4 light irradiations are performed in about a central portion of the rectangular region 721; while the number of multiple irradiations in a portion between the positions x1 and x2 decreases linearly from the position x2 to x1, with the passing of the region 721a.

By repetition of light irradiations by the regions 711a and 721a, the number of multiple irradiations on the shared writing region 73 also becomes M/4. As a result, the entire substrate 9 can be irradiated with a (M/4)-step gradation centered about each of the writing cells 620.

When K addresses, instead of 4 addresses, are interpolated between two adjacent irradiation regions 61 arranged in the row direction, light irradiations are performed (M/K) times (M/K shall be an integer obtained by omitting fractions; the same is true in the following cases) on each of the writing regions 620 that are located in about a central portion of one strip on the substrate 9 with respect to the sub-scanning direction. The number of multiple irradiations on the shared writing region 73 is also (M/K) because of light irradiations by a pair of right-triangle regions. Thus, the entire substrate 9 can be irradiated with a (M/4)-step gradation centered about each of the writing cells 620.

In the pattern writing apparatus 1, as above described, the irradiation region group is scanned in the main scanning direction that is angled (or tilted) relative to the direction of its arrangement, so that a plurality of irradiation regions pass over each of the writing regions fixed on the substrate 9. Also, the irradiation region group is intermittently moved relative to the substrate 9 by a distance shorter than the width of the irradiation region group in the sub-scanning direction. This permits more efficient pattern writing than when only irradiation regions which are located in about a central portion with respect to the sub-scanning direction (for example in the region 721 of FIG. 9, irradiation regions included in a region 721b between the positions x2 and x3) are utilized for pattern writing that is repeated for each strip (that is, strips are connected together without overlapping). Further, even if slight errors occur in the intermittent travel distance of the irradiation region group, the possibility of forming between adjacent strips such a region that is not irradiated with light or that is irradiated with light more than necessary is reduced; therefore, high-precision high-speed pattern writing can be achieved.

Furthermore, the travel distance of the irradiation region group in the sub-scanning direction in one intermittent movement is made equal to the width of one side of a rectangular region in the sub-scanning direction the one side being parallel to the row direction of the rectangular region defined by the outer rim of the whole irradiation region group. By so doing, the number of multiple irradiations on the writing region group on the substrate 9 with respect to the X direction becomes equal over a wide range, and the occurrence of unevenness in pattern writing on the substrate 9 can be prevented.

In the pattern writing apparatus 1, the intermittent travel distance A of the irradiation region group may slightly be changed as required, as long as the distance A is approximately equal to the width of one side of the rectangular regions 711, 721 in the sub-scanning direction, the one side being parallel to the row direction of the rectangular regions 711, 721. For example, when the sensitivity of the photoresist film on the substrate 9 decreases because of a long time interval between the first pattern writing on the shared writing region 73 (i.e., writing of the n-th strip 71) and the second pattern writing (i.e., writing of the (n+1)-th strip 72), it is possible by reducing the intermittent travel distance A and expanding the width C of the shared writing region 73 to increase the number of multiple irradiations on the writing regions 620 in the shared writing region 73 and thereby to increase the cumulative amount of light (see FIG. 9). Also, when an overall reduction in the number of multiple irradiations is allowed, it is possible by increasing the intermittent travel distance A and narrowing the width C of the shared writing region 73 to reduce the number of strips on the entire substrate 9 and thereby to achieve short-time efficient pattern writing.

Next, we describe a technique for generating writing cell data in the pattern writing apparatus 1. First, a writing region group in a single strip is described.

As previously described, the DMD 42 has micromirrors arranged in an array of M rows and N columns in two directions perpendicular to each other, and the irradiation region group contains irradiation regions arranged in M rows and N columns as well. When four writing regions are interpolated between adjacent irradiation regions arranged in the row direction, the number of columns of writing regions in a single strip the columns extending in the main scanning direction, is (4×(N+M/4−1)), and (4×(M/4−1)) columns are contained in the shared writing region. Generally, when K writing regions are interpolated between adjacent irradiation regions, the number of columns of writing regions in a single strip can be expressed by the expression, (K×(N+M/K−1)), and the number of columns in the shared writing region can be expressed by the expression, (K×(M/K−1)).

Figure 10:
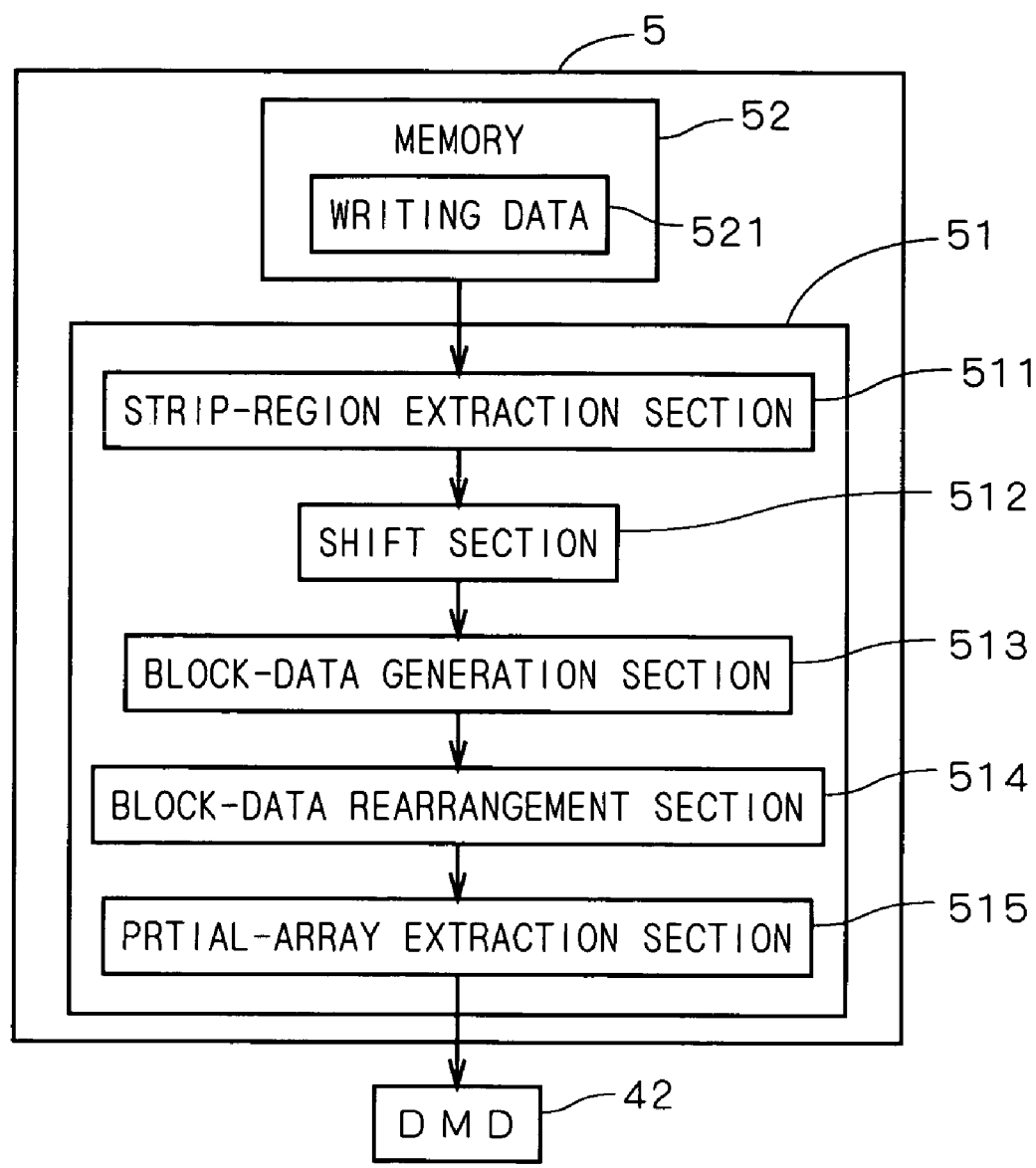
FIG. 10 is a diagram illustrating a structure of a data generator.
Figure 11:
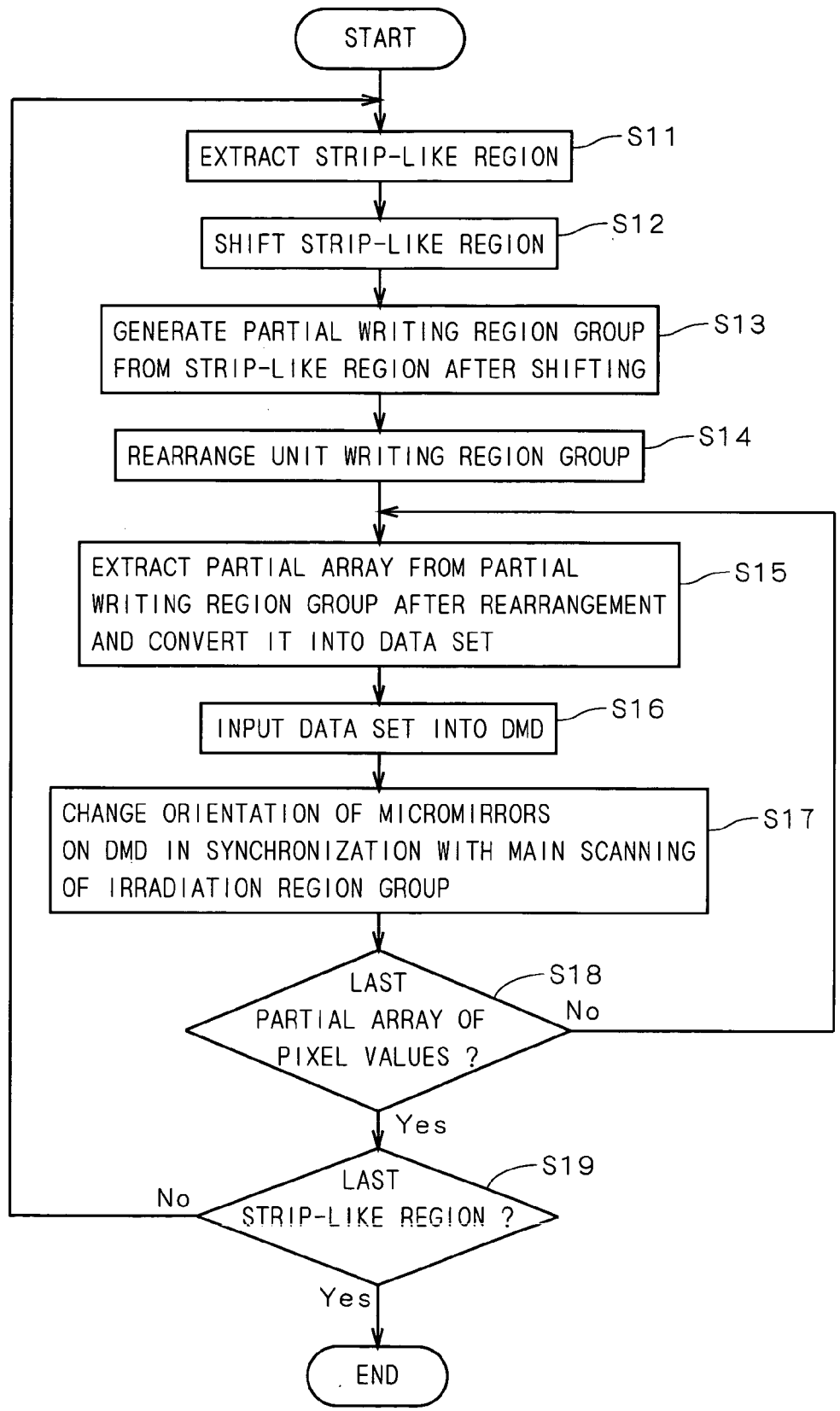
FIG. 11 is a flowchart showing a process of generating writing cell data.

FIG. 10 is a diagram illustrating the structure of the data generator 51 achieved by electrical circuits, and FIG. 11 is a flowchart showing a process of generating writing cell data. In the following description, an image to be written is divided into a plurality of writing regions, and data (hereinafter referred to as "writing data") 521 indicating pixel values, each of which is "1" or "0", related to respective writing regions is prepared and stored in a memory 52 in the controller 5. For purposes of description, four writing regions are interpolated between adjacent irradiation regions arranged in the row direction, and the irradiation region group contains 8 rows and N columns of irradiation regions. However, it is to be understood that the number of addresses interpolated between adjacent irradiation regions may be numbers other than 4 and the array of the irradiation region group is not limited to 8 rows and N columns.

In the pattern writing apparatus 1, first, a strip-like writing region group that corresponds to one main scanning of the irradiation region group is specified according to the writing data 521 and an array of pixel values of the writing region group is extracted (step S11). More specifically, a strip-region extraction section 511 sequentially extracts a (pixel value of) writing region from an array of pixel values of (4×(N+M/4−1)) columns of writing regions (an array of pixel values is hereinafter referred to simply as the "writing region group") that corresponds to a target strip to be written, and outputs it to a shift section 512.

Figure 12:
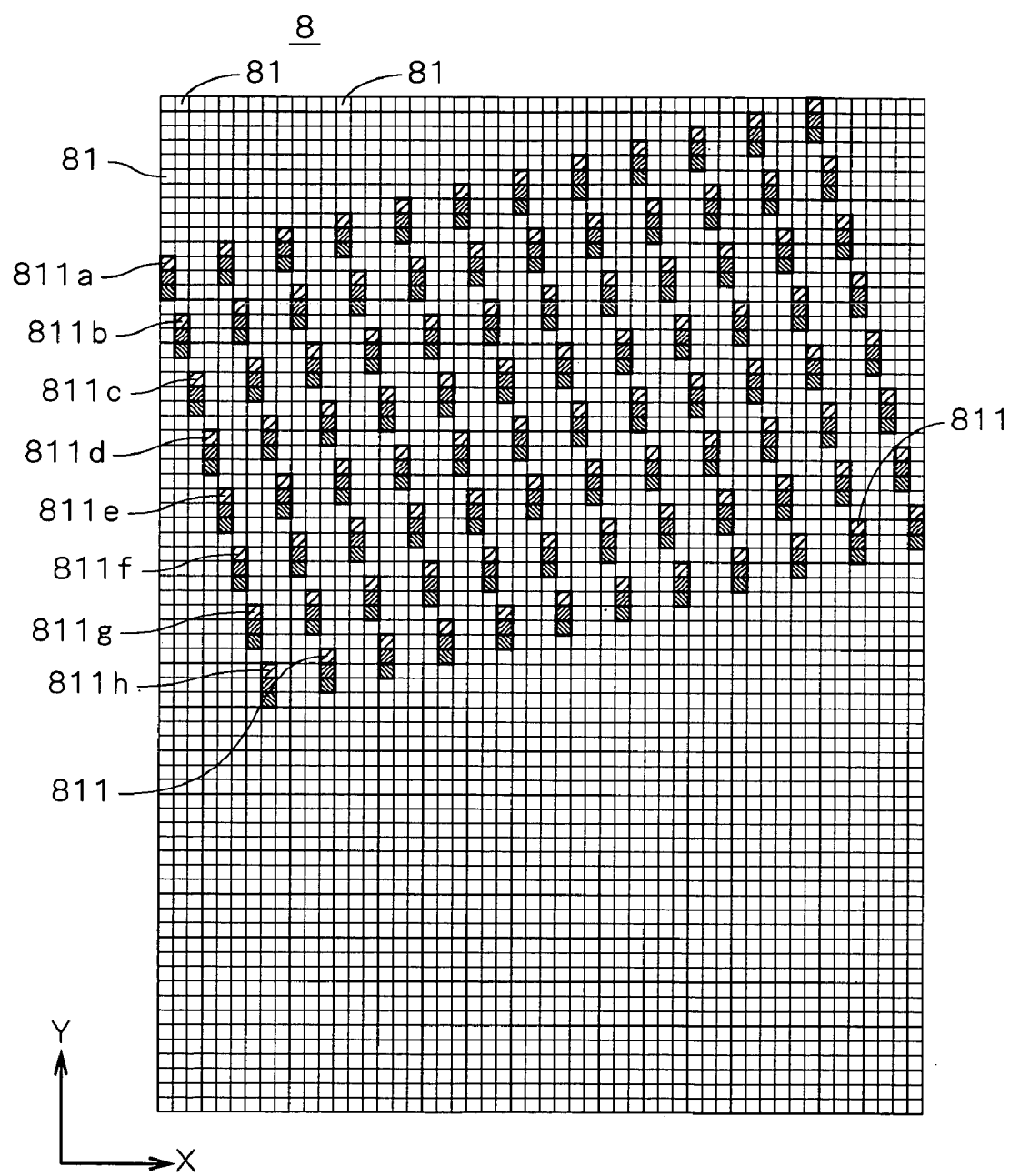
FIG. 12 is a diagram illustrating strip-like writing region group.

FIG. 12 is a diagram illustrating a strip-like writing region group 8 extracted. The writing region group 8 in FIG. 12 contains writing regions 81 arranged in numbers of rows and columns in the Y (main scanning) and X (sub-scanning) directions. In FIG. 12, a plurality of writing regions located at the centers of the irradiation regions in one light irradiation by the DMD 42 are designated by the numeral 811, and the writing regions 811 in the outermost column on the (−X) side, out of the columns of the writing regions 811 arranged in a direction approximately along the main scanning direction (i.e., in a direction corresponding to the column direction of the irradiation region group), are respectively designated by 811a, 811b, 811c, 811d, 811e, 811f–811g and 811h, downwardly from the (+Y) side.

In the shift section 512, each array of the writing regions 81 arranged in the main scanning direction in the strip-like writing region group 8 is shifted in the main scanning direction (step S12). More specifically, concerning four consecutive columns in the X direction out of the columns of writing regions 81 arranged in the Y direction, the column including the writing region 811a is retained as is and the columns respectively including the writing regions 811b, 811c and 811d are shifted in the (+Y) direction by amounts equivalent to 4 writing regions, 8 writing regions, and 12 writing regions, respectively. As for the next four columns, the column including the writing region 811e is shifted in the (−Y) direction by an amount equivalent to one writing region, and the columns respectively including the writing regions 811f, 811g and 811h are shifted in the (+Y) direction by amounts equivalent to 3 writing regions, 7 writing regions and 11 writing regions, respectively.

Figure 13:
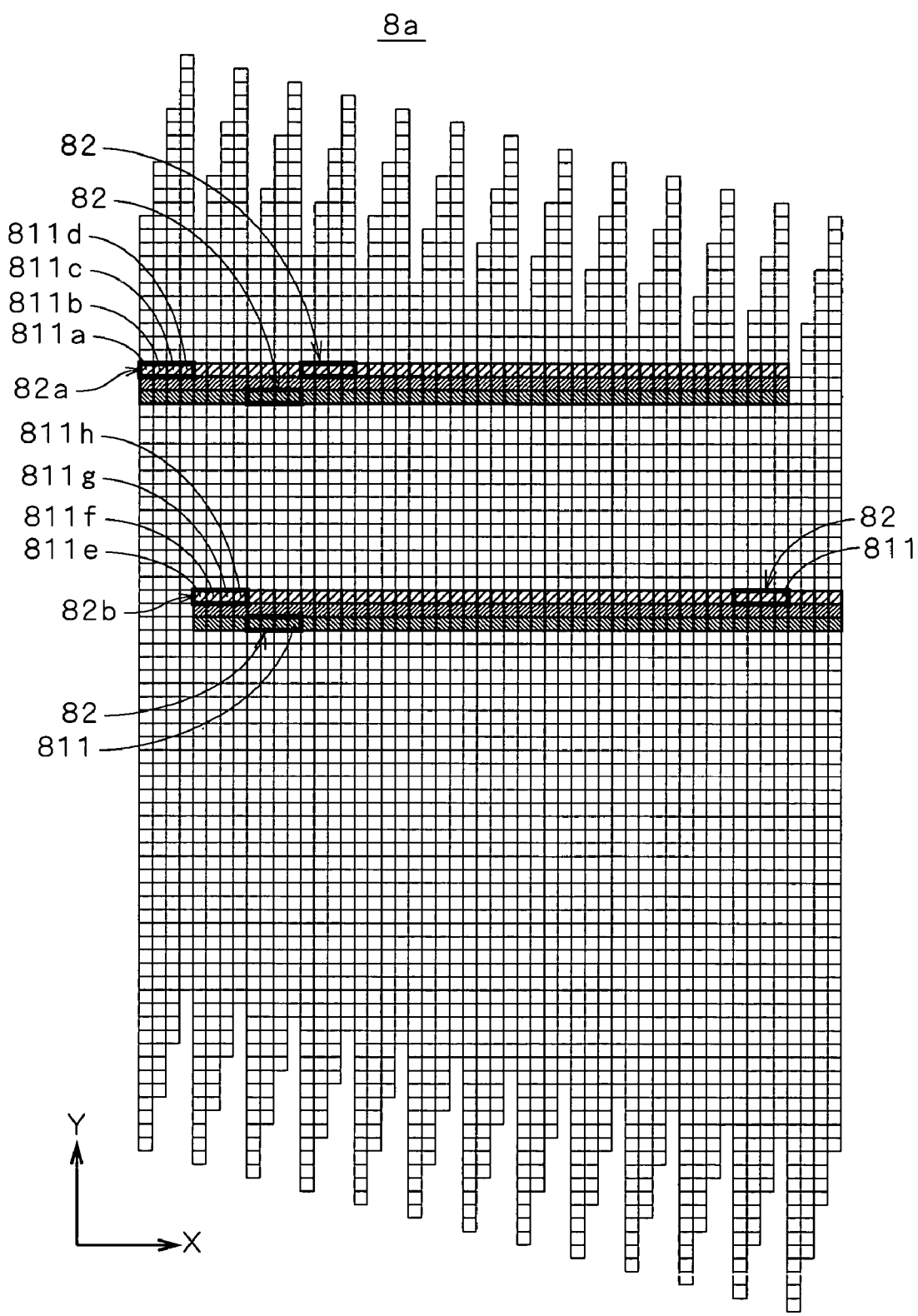
FIG. 13 is a diagram illustrating writing region groups after shifting.

FIG. 13 is a diagram illustrating a writing region group 8a after shifting. Out of the writing regions 811a through 811h arranged in a direction approximately along the main scanning direction in the writing region group 8 before the shifting, the four writing regions 811a through 811d are aligned in a row in the sub-scanning direction, forming a unit writing region group 82a in the writing region group 8a. The remaining four writing regions, 811e through 811h are spaced 17 writing regions in the (−Y) direction from the unit writing, region group 82a and aligned in a row in the sub-scanning direction, forming a unit writing region group 82b.

In the shift section 512, in this way, each four writing regions 811 arranged in a direction approximately along the main scanning direction, out of the writing regions 811 corresponding to one light irradiation by the irradiation region group, are shifted and arranged adjacent each other in the sub-scanning direction as a unit writing region group 82. In FIG. 13, only part of the unit writing region groups 82 are shown. It is to be understood that, in the shift section 512, the number of writing regions 811 contained in a single unit writing region group is not necessarily be four but it may be changed as appropriate depending on, for example, the inclination of the irradiation region group (specifically, in accordance with the number of addresses that are interpolated between adjacent irradiation regions).

If j is the position of a column of the writing regions 81 (arranged in the main scanning direction) with respect to the X direction, the amount of shift of the column in the strip-like writing region group 8 is expressed by the following equation (1):

$$\alpha = (12 - (j\%4) \times 4) + j/4 \quad (1)$$

where (j%4) and (j/4) are respectively the remainder and the quotient in the division of j by 4.

Figure 14:
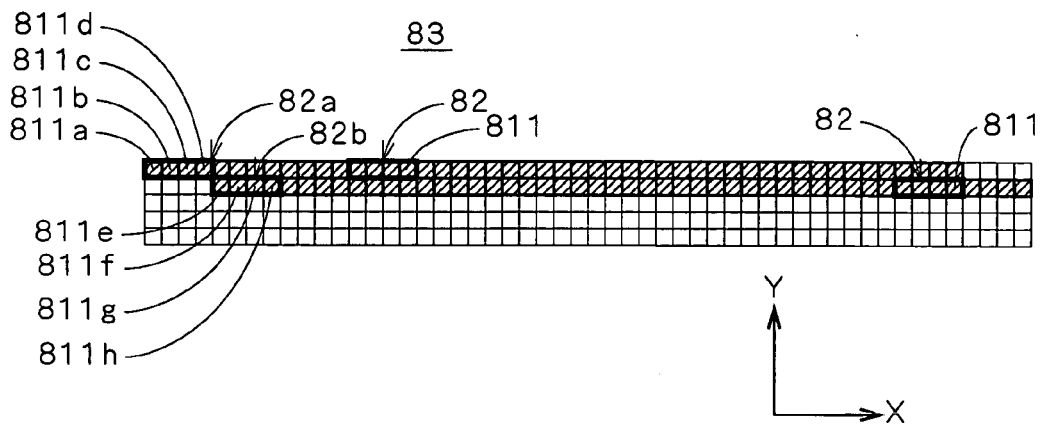
FIG. 14 is a diagram illustrating a partial writing region group.

A block-data generation section 513 extracts writing regions arranged in the sub-scanning direction (i.e., a row of the unit writing region groups 82 arranged in the sub-scanning direction; hereinafter referred to simply as a "unit writing region row") from the writing region group 8a after shifting and generates a partial writing region group (hereinafter also referred to as "block data") 83 as illustrated in FIG. 14 (step S13). More specifically, when extracting a unit writing region row including the unit writing region group 82a, the block-data generation section 513 continuously extracts a unit writing region row including the unit writing region group 82b that is spaced 17 writing regions in the (−Y) direction from the unit writing region group 82a. Then, the extracted plurality of unit writing region rows are sequentially arranged adjacent each other in the (−Y) direction, forming one partial writing region group 83 as illustrated in FIG. 14.

Also, for a plurality of unit writing region rows extracted in FIG. 13, other partial writing region groups 83 are generated by extracting a plurality of unit writing region rows adjacent thereto on the (−Y) side. In this way, at every 17 writing regions that are the spacing in main scanning direction between the writing regions located at the centers of the irradiation regions in one light irradiation, the block-data generation section 513 extracts writing regions arranged in the sub-scanning direction from the writing region group 8a after shifting, thereby to generate 17 block data.

A block-data rearrangement section 514 rearranges each of the unit writing region groups 82 in each of the 17 partial writing region groups 83 (step S14). Looking at, for example, the unit writing region group 82a in the partial writing region group 83 of FIG. 14, the block-data rearrangement section 514 arranges the writing regions 811a to 811d in the unit writing region group 82a adjacent each other in the (−Y) direction, starting in sequence from the writing region 811a. Similarly, the writing regions 811e to 811h in the unit writing region group 82b are arranged adjacent each other in the (−Y) direction, starting in sequence from the writing region 811e. In this way, for each of the plurality of partial writing region groups 83, the block-data rearrangement section 514 changes the direction of arrangement of the unit writing region groups 82 into the main scanning direction, thereby to generate a new array of pixel values of writing regions (hereinafter referred to as a "frame") 84.

The aforementioned steps S11 through S14 are performed in the pattern writing apparatus 1 when the light irradiation region group is moved to a start position for writing of a target strip to be written. Through those processes, data indicating a plurality of frames 84 is prepared for a target strip. Next, the following process is performed in synchronization with main scanning of the irradiation region group.

After the generation of the 17 frames 84 for a target strip, a partial-array extraction section 515 selects one of the 17 frames 84 according to writing regions located at the centers of the irradiation regions in the next light irradiation. For example in the writing region group 8 of FIG. 12, when the writing regions 811 are located at the centers of the irradiation regions in the next light irradiation, a frame 84 of FIG. 15 including the writing regions 811 is selected from the 17 frames 84. In the selected frame 84, then, two rows (i.e., an array enclosed by dashed lines in FIG. 15; hereinafter referred to as a "partial array") 85 are extracted from the rows of the unit writing region groups 82 arranged in the sub-scanning direction. In the extracted partial array 85, a single row of the unit writing region groups 82 arranged in the sub-scanning direction (i.e., four rows of pixel values) is handled as one set of pixel values, and as illustrated in FIG. 16, the sets of pixel values are rearranged by being shifted in the (−X) direction by an amount equivalent to one unit writing region group, according to the order of arrangement in the (−Y) direction.

Figure 16:
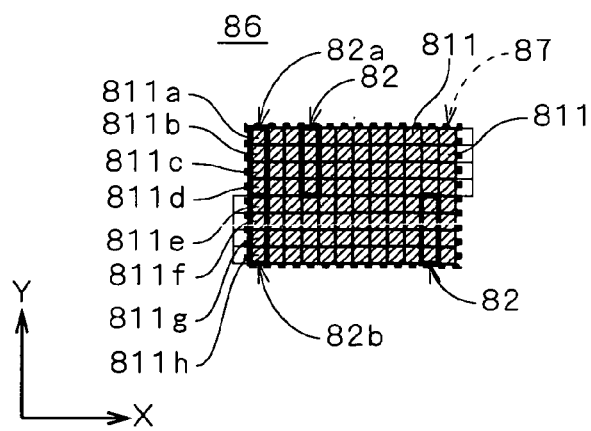

The partial-array extraction section 515 specifies 8 rows and N columns of pixel values (i.e., pixel values included in a region 87 enclosed by dashed lines in FIG. 16) which correspond to an array of micromirrors of the DMD 42, in a partial array 86 after shifting as illustrated in FIG. 16 and handles them as a single data set. Thus, the partial-array extraction section 515 extracts a partial array from the plurality of frames 84 according to writing regions located at the centers of the irradiation regions in the next light irradiation and converts the partial array into a single data set (step S15).

In actual practice, as illustrated in a partial array 86a after shifting in FIG. 17, the partial array includes a number of rows of the unit writing region groups. In FIG. 17, pixel values included in a region 87a enclosed by dashed lines are handled as a single data set. The region 87a contains pixel values in M rows and N columns, while regions designated by the numeral 88 on opposite sides of the region 87a contain pixel values only in part of M rows and (M/4−1) columns.

As previously described, the data set is inputted into the DMD 42 after transmission of a reset pulse that corresponds to light irradiation immediately before light irradiation on the writing regions 811 (step S16). At this time, each pixel value included in the data set is the writing cell data to be written into a memory cell of each micromirror of the DMD 42. Then, by transmission of a next reset pulse in synchronization with main scanning of the irradiation region group, the orientations of the micromirrors of the DMD 42 are changed and light irradiation (i.e., ON/OFF control of light irradiation) is performed centered about the writing regions 811 located at the centers of the irradiation regions (step S17).

Figure 15:
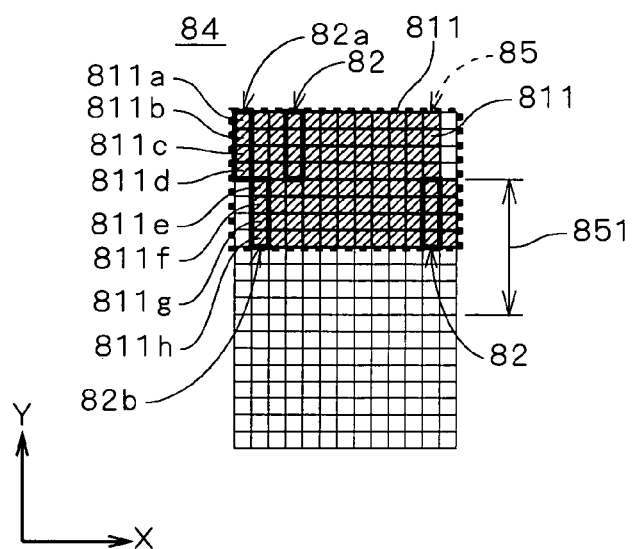
FIG. 15 is a diagram illustrating a frame.

In the pattern writing apparatus 1, the steps S15 through S17 are repeated until light irradiation on the last writing regions (i.e., the writing regions located on the outermost (−Y) side) is performed (step S18). For example, when a reset pulse corresponding to light irradiation subsequent to that on the writing regions 811 is transmitted, the next frame 84 is selected from the 17 frames 84 and a corresponding partial array 85 is extracted to generate a data set. When the seventeenth reset pulse since the first light irradiation on the writing regions 811 is transmitted, two rows of the unit writing region groups arranged in the sub-scanning direction, or the range designated by 851 in FIG. 15, are extracted as a partial array 85 for generation of a data set.

The process of extracting the partial array 85 from the plurality of frames 84 and converting it into a data set (step S15) is repeated substantially in parallel with the process of repeating light irradiations on the irradiation region group (step S17). When light irradiation on the last writing regions is completed, the irradiation region group moves to a next strip and the steps S11 through S18 are repeated (step S19). In actual practice, for speeding up of processing, the next steps S11 through S14 are performed during the steps S15 through S18.

Through the above processes, the pattern writing apparatus 1 can properly generate a data set that is inputted in every light irradiation into the DMD 42 which forms the irradiation region group arranged inclined relative to the main scanning direction. Further since, in the above processes, the data set is generated in parallel with repetition of light irradiations on the irradiation region group, a high-capacity memory is not necessary and thus the manufacturing cost of the pattern writing apparatus 1 can be reduced. Furthermore, the use of the frames 84 allows easy handling of writing cell data to be inputted into the DMD 42, thereby resulting in high-speed pattern writing. It is to be understood that each component of the data generator 51 need not necessarily be achieved by electrical circuits, but all or part of the functions of the data generator 51 may be achieved by software.

When K addresses, instead of 4 addresses, are interpolated between adjacent irradiation regions arranged in the row direction, the parts that are concerned with the number of interpolation addresses should suitably be changed according to the number of addresses K for generation of the writing cell data. For example, the equation (1) for giving the amount of shift of the column of writing regions arranged in the main scanning direction is replaced with the following equation (2):

$$\alpha = (12 - (j \% K) \times K) + j/K \qquad (2)$$

In the writing region group after shifting, a single unit writing region group is constituted by K writing regions. Then. ($K^2+1$) partial writing region groups are obtained and frames are generated, whereby a data set in the case when K addresses are interpolated is generated.

Now, in the pattern writing on the substrate 9 by the pattern writing apparatus 1, for example, the ON/OFF control of the writing regions may be performed once while the writing regions move a distance three times the pitches P relative to the writing regions (triple-speed operation). In this case, if M is the number of rows of the DMD 42, in the writing region group 8a after shifting in FIG. 13, the position of a unit writing region row with respect to the Y direction in the f-th partial writing region group 83 is obtained from the following equation (3):

f:0 to 16

$$i = (f \times 3) + 17 \times k : k = 0 \text{ to } (M \% 17 - 1) \qquad (3)$$

where (M/17) is the quotient in the division of M by 17.

In the right side of the equation (3), the first term (f×3) indicates that the irradiation region group moves a distance equivalent to three writing regions in the Y direction for every change of the frame 84. The second term indicates that, as is the case of FIG. 13, a unit writing region row is extracted from the writing region group 8a for every 17 rows. Here, 3 and 17 are both prime numbers; thus, when i is large enough, only one set of f and k can be obtained for each value, i, and each unit writing region row can be included in either one of the frames 84. Consequently, triple-speed writing can be achieved without deteriorating the accuracy of writing very much. It is to be understood that the writing speed may be twice, quadruple or more.

Considering that the intervals between the unit writing region rows extracted from the writing region group 8a should preferably be prime numbers not too small or too large, it is preferable that, as shown in FIG. 5, a center-to-center distance along the main scanning direction between two adjacent irradiation regions 61 arranged in the main scanning direction is equivalent to 4 pitches of the writing regions 620, and a center-to-center distance along the sub-scanning direction therebetween is equivalent to one pitch of the writing regions 620.

The present invention has been described with reference to the preferred embodiments thereof, but it should be understood that it is not limited to the aforementioned preferred embodiments and various changes and modifications are possible.

The spatial light modulator in the pattern writing apparatus 1 is not limited to the DMD 42 employed in the aforementioned preferred embodiments; in fact, it may be a liquid crystal shutter, for example. Also, pattern writing may be achieved by arranging, for example, a plurality of light emitting diodes in two dimensions as a light source, tilting the direction of arrangement of an irradiation region group corresponding to the light emitting diode group relative to the main scanning direction, and exercising ON/OFF control of each of the light emitting diodes in synchronization with relative movement of the irradiation regions.

The relative movement of the stage 2 and the head 4 in the main scanning direction and in the sub-scanning direction (i.e., relative movement of the writing region group and the irradiation region group on the substrate 9) may be substituted by movement of only either one of the stage 2 and head 4.

The relationship between the irradiation region group and the writing regions are not limited to those described in the aforementioned preferred embodiments, and they may be changed as appropriate according to machine specifications. In this case, the tilt angle of the irradiation region group relative to the main scanning direction is changed as appropriate according to the sizes of the irradiation regions and the writing regions and according to the number of multiple irradiations.

While the invention has been shown and described in detail, the foregoing description is in all aspects illustrative and not restrictive. It is therefore understood that numerous modifications and variations can be devised without departing from the scope of the invention.

What is claimed is:

1. A pattern writing apparatus for writing a pattern by light irradiation on a photosensitive material, comprising:
    a spatial light modulator applying a modulated light beam to an irradiation region group arrayed in a lattice arrangement on a photosensitive material;
    a main scanning mechanism for scanning said irradiation region group over a photosensitive material in a main scanning direction that is tilted relative to a direction of arrangement of said irradiation region group, so that a plurality of irradiation regions pass over each of writing regions included in a writing region group fixed on said photosensitive material;
    a sub-scanning mechanism for intermittently moving said irradiation region group relative to a photosensitive material in a sub-scanning direction orthogonal to said main scanning direction by a distance shorter than a width of said irradiation region group in said sub-scanning direction; and
    a controller controlling said spatial light modulator in synchronization with main scanning of said irradiation region group.

2. The pattern writing apparatus according to claim 1, wherein
    said spatial light modulator comprises an array of a plurality of micromirrors, orientations of which are individually changed.

3. The pattern writing apparatus according to claim 1, wherein
    said irradiation region group is a rectangular region in which irradiation regions are arrayed at equal pitches in two directions perpendicular to each other.

4. The pattern writing apparatus according to claim 3, wherein
    a travel distance of said irradiation region group in said sub-scanning direction in one intermittent movement is approximately equal to a width of one side of said rectangular region in said sub-scanning direction, said one side extending approximately along said sub-scanning direction.

5. The pattern writing apparatus according to claim 3, wherein
an equation, A=B×cos θ is satisfied,
where A is a travel distance of said irradiation region group in said sub-scanning direction in one intermittent movement, B is a length of one side of said rectangular region, said one side extending approximately along said sub-scanning direction, and θ is an angle formed between said sub-scanning direction and a direction approximately along said sub-scanning direction out of two directions of arrangement of said irradiation region group.

6. The pattern writing apparatus according to claim 3, further comprising
a data generator generating data inputted into said spatial light modulator, wherein
said data generator performs the steps of:
extracting a strip-like writing region group, which corresponds to one main scanning of said irradiation region group, from said writing region group;
shifting, in said main scanning direction, each array of writing regions arranged in said main scanning direction in said strip-like writing region group so that writing regions corresponding to one light irradiation on said irradiation region group are arranged in said sub-scanning direction; and
generating a data set, which is inputted into said spatial light modulator for each light irradiation, from pixel values each associated with each writing region in a writing region group after shifting.

7. The pattern writing apparatus according to claim 6, wherein
out of writing regions corresponding to one light irradiation in said strip-like writing region group, writing regions which are arranged in a direction approximately along said main scanning direction are arranged adjacent each other in said sub-scanning direction as a unit writing region group in said writing region group after shifting,
said step of generating a data set comprises the steps of:
at every spacing in said main scanning direction between writing regions located at centers of said irradiation region group in one light irradiation, extracting writing regions which are arranged in said sub-scanning direction from said writing region group after shifting, thereby to generate a plurality of partial writing region groups;
in each of said plurality of partial writing region groups, rearranging writing regions of each unit writing region group in said main scanning direction, thereby to generate an array of a plurality of pixel values; and
extracting a partial array from said array of a plurality of pixel values and converting said partial array into said data set.

8. The pattern writing apparatus according to claim 7, wherein
said step of converting said partial array into said data set is repeated in parallel with repetition of light irradiation on said irradiation region group.

9. The pattern writing apparatus according to claim 1, wherein
a pattern is written on a photoresist film on a substrate.

10. The pattern writing apparatus according to claim 1, wherein
said main scanning mechanism continuously moves said irradiation region group.

11. A pattern writing method of writing a pattern by light irradiation on a photosensitive material, comprising the steps of:
applying a modulated light beam generated by a spatial light modulator to an irradiation region group arrayed in a lattice arrangement on a photosensitive material with scanning said irradiation region group over a photosensitive material in a main scanning direction that is tilted relative to a direction of arrangement of said irradiation region group, so that a plurality of irradiation regions pass over each of writing regions included in a writing region group fixed on said photosensitive material;
controlling said spatial light modulator in synchronization with main scanning of said irradiation region group; and
moving said irradiation region group relative to a photosensitive material in a sub-scanning direction orthogonal to said main scanning direction by a distance shorter than a width of said irradiation region group in said sub-scanning direction after scanning in said main scaning direction, thereby to locate said irradiation region group at a start position for a next main scan.

12. The pattern writing method according to claim 11, wherein
said spatial light modulator comprises an array of a plurality of micromirrors, orientations of which are individually changed.

13. The pattern writing method according to claim 11, wherein
said irradiation region group is a rectangular region in which irradiation regions are arrayed at equal pitches in two directions perpendicular to each other.

14. The pattern writing method according to claim 13, wherein
a travel distance of said irradiation region group in said sub-scanning direction in one intermittent movement is approximately equal to a width of one side of said rectangular region in said sub-scanning direction, said one side extending approximately along said sub-scanning direction.

15. The pattern writing method according to claim 13, wherein
an equation, A=B×cos θ is satisfied,
where A is a travel distance of said irradiation region group in said sub-scanning direction in one intermittent movement, B is a length of one side of said rectangular region, said one side extending approximately along said sub-scanning direction, and θ is an angle formed between said sub-scanning direction and a direction approximately along said sub-scanning direction out of two directions of arrangement of said irradiation region group.

16. The pattern writing method according to claim 13, further comprising the steps of:
extracting a strip-like writing region group, which corresponds to one main scanning of said irradiation region group, from said writing region group;
shifting, in said main scanning direction, each array of writing regions arranged in said main scanning direction in said strip-like writing region group so that writing regions corresponding to one light irradiation on said irradiation region group are arranged in said sub-scanning direction; and generating a data set, which is inputted into said spatial light modulator for each light irradiation, from pixel values each associated with each writing region in a writing region group after shifting.

17. The pattern writing method according to claim 16, wherein out of writing regions corresponding to one light irradiation in said strip-like writing region group, writing regions which are arranged in a direction approximately along said main scanning direction are arranged adjacent each other in said sub-scanning direction as a unit writing region group in said writing region group after shifting, said step of generating a data set comprises the steps of:

at every spacing in said main scanning direction between writing regions located at centers of said irradiation region group in one light irradiation, extracting writing regions which are arranged in said sub-scanning direction from said writing region group after shifting, thereby to generate a plurality of partial writing region groups;

in each of said plurality of partial writing region groups, rearranging writing regions of each unit writing region group in said main scanning direction, thereby to generate an array of a plurality of pixel values; and extracting a partial array from said array of a plurality of pixel values and converting said partial array into said data set.

18. The pattern writing method according to claim 17, wherein said step of converting said partial array into said data set is repeated in parallel with repetition of light irradiation on said irradiation region group.

19. The pattern writing method according to claim 11, wherein a pattern is written on a photoresist film on a substrate.

20. The pattern writing method according to claim 11, wherein said irradiation region group continuously moves.

* * * * *